Figure 2:
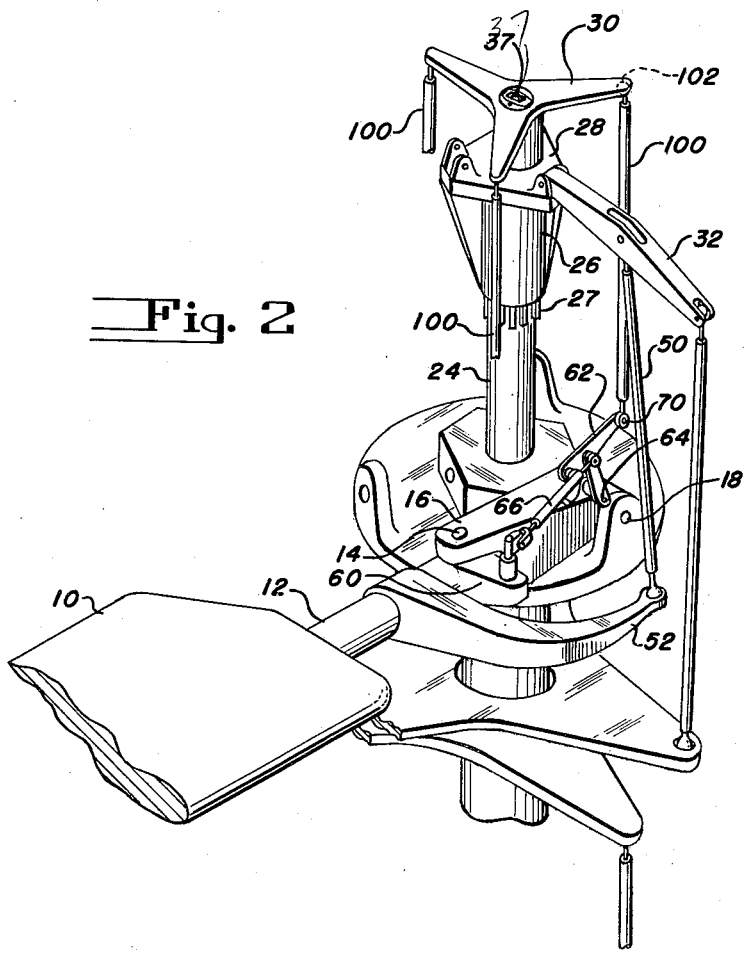

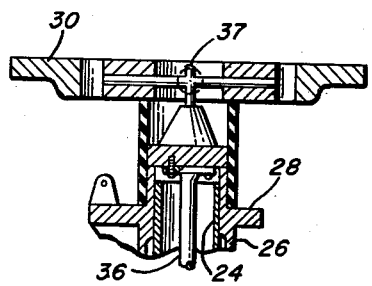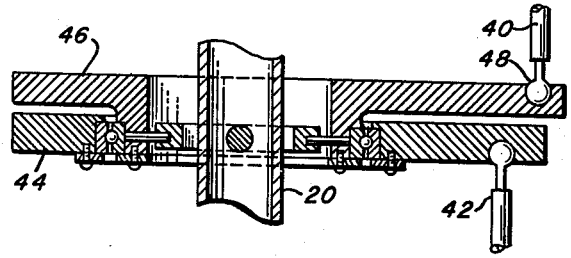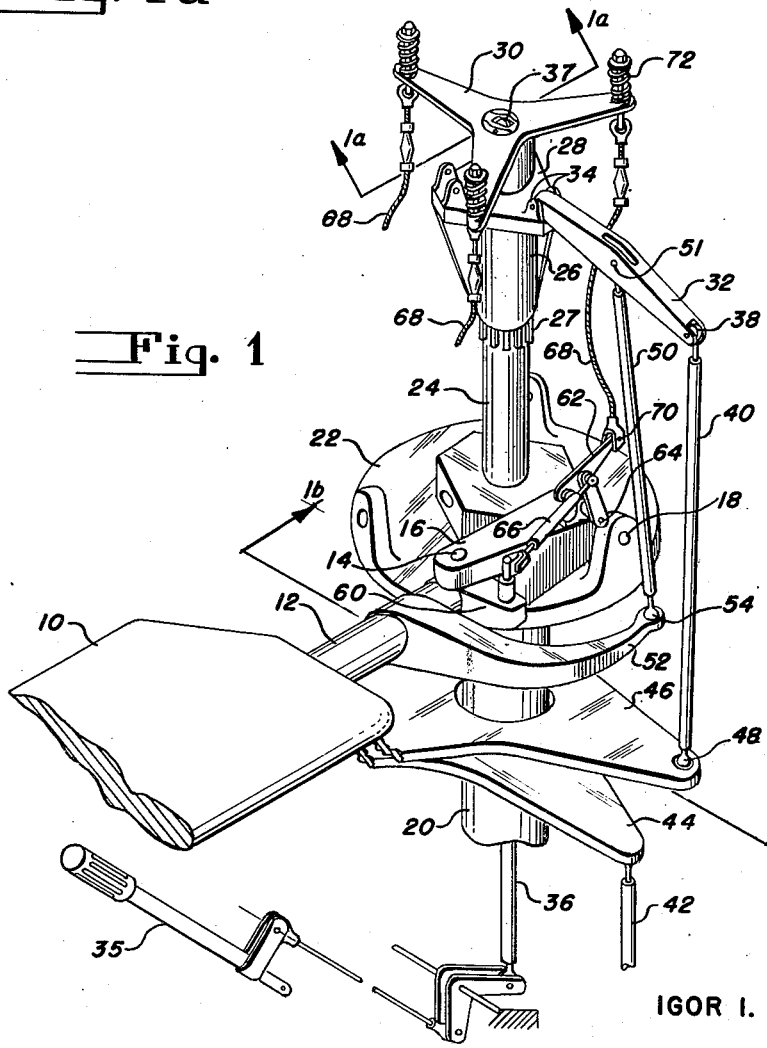

Feb. 10, 1953     I. I. SIKORSKY     2,627,929
HELICOPTER ROTOR

Filed March 26, 1947     3 Sheets-Sheet 2

IGOR I. SIKORSKY
INVENTOR

BY Charles L. Shelton

ATTORNEY

Feb. 10, 1953     I. I. SIKORSKY     2,627,929
HELICOPTER ROTOR

Filed March 26, 1947     3 Sheets-Sheet 3

IGOR I. SIKORSKY
INVENTOR

BY Charles F. Shelton
ATTORNEY

Patented Feb. 10, 1953

2,627,929

UNITED STATES PATENT OFFICE 2,627,929

HELICOPTER ROTOR

Igor I. Sikorsky, Bridgeport, Conn., assignor to United Aircraft Corporation, East Hartford, Conn., a corporation of Delaware Application March 26, 1947, Serial No. 737,247

11 Claims. (Cl. 170—160.25)

This invention relates to helicopters and particularly to providing a helicopter which is safer and easier to fly and which will reduce pilot fatigue and the presently required pilot training time.

Accordingly, an object of this invention is to provide a helicopter rotor head which will automatically reduce the pitch of the blades upon excessive coning of the blades or when the blades are auto-rotated as a result of power failure and during power-off maneuvers.

Another object of this invention is to provide a rotor head which is fully automatic.

A further object is to provide a helicopter wherein the total pitch setting of the blades is obtained through automatic means.

A further object is to provide a helicopter in which the total pitch control may be eliminated and the pilot need concern himself only with the azimuth (cyclic pitch) stick, the throttle control and the tail rotor control pedals. The throttle control may conveniently be mounted on the azimuth stick so that the pilot will have one hand free at all times to operate various accessory apparatus such as the radio and the hydraulic hoist.

Another object is to provide a helicopter wherein the total pitch of the blades is determined by the throttle setting.

A still further object of the invention is to provide compensating mechanism for acting on the collective pitch control means to increase the pitch of all the blades upon movement of said blades in unison about either their drag hinges or their flapping hinges.

Further objects and advantages will be either obvious or pointed out in the following specification and claims.

Figure 3:
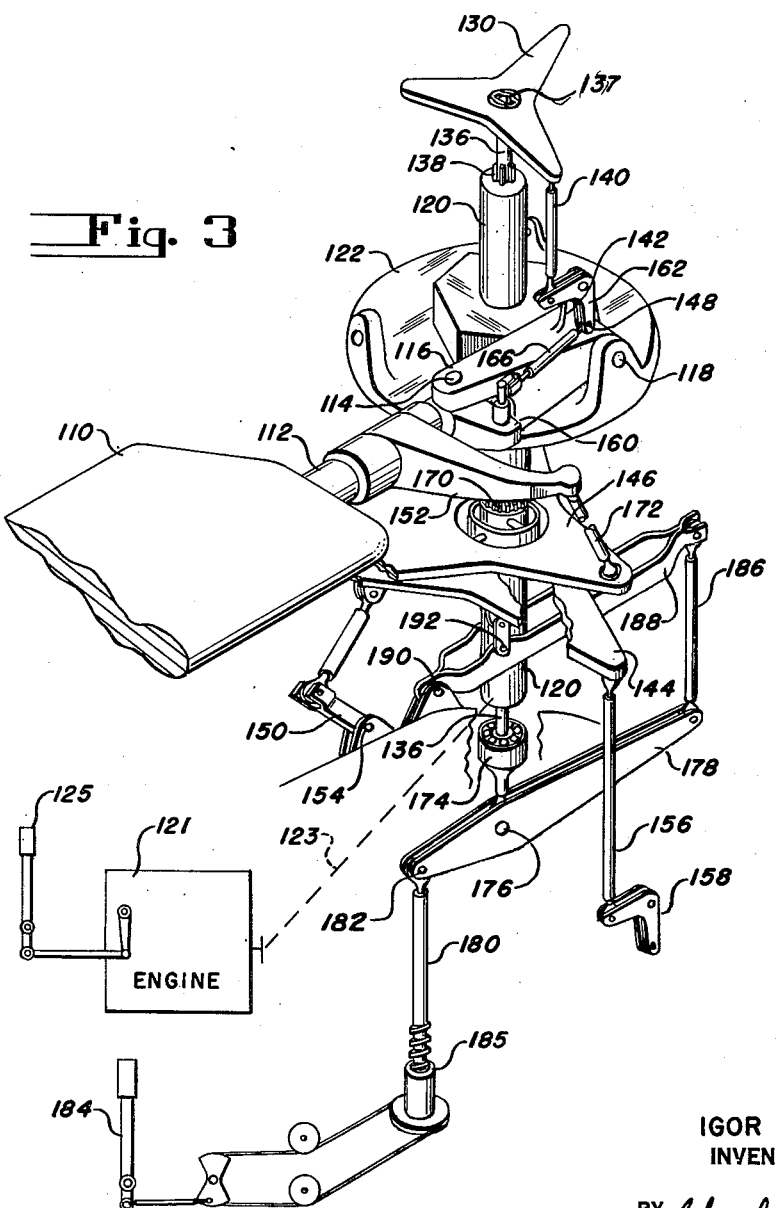

In the drawings,

Fig. 1 is a somewhat diagrammatic illustration of one embodiment of my invention wherein the blade pitch is reduced when the blades are collectively auto-rotated or when the blades cone to excess;

Figs. 1a and 1b are fragmentary sectional views taken on lines 1a—1a and 1b—1b respectively of Fig. 1 on an enlarged scale;

Fig. 2 is partly diagrammatic and illustrates a fully automatic embodiment of my invention; and Fig. 3 is a partly diagrammatic view of another fully automatic embodiment of my invention.

The modifications of my invention disclosed in Figs. 1 and 2 are shown applied to the type of rotor head utilized in the well-known Sikorsky R-4 Helicopter, and disclosed in detail in my Patent No. 2,517,509, issued August 1, 1950. The modification of Fig. 3 shows my invention applied to a modified rotor head of the general type used on the Sikorsky R-5 and R-6 Helicopters and disclosed in the Sikorsky et al. Patent No. 2,529,635, issued November 14, 1950, and the R. P. Alex et al., U. S. Patent No. 2,599,690, issued June 10, 1952. In all the modifications shown the rotor blades are connected to the drive shaft through a drag hinge and an off-set flapping hinge. It is the purpose of my invention to utilize the characteristic motions of the blades about these hinges to either modify the total pitch setting of the blades or to render the total pitch setting fully automatic.

It has been the custom on all production helicopters to date to synchronize the throttle and the total pitch control so that pitch may not be applied to the rotor without a corresponding increase in engine power output, thus preventing stalling of the rotor blades. With throttle and pitch synchronization, excessive coning of the blades will not occur in normal power-on operation. In the event of engine failure, however, the rotor will continue to rotate (due to provision of an overrunning clutch) and the blades will move forward into the auto-rotational position. When the blades move forward in this manner, the pitch is not decreased until such time as the rotor speed becomes low enough to cause the blades to cone to excess or until the pilot manually decreases the pitch. Upon the blades coning to excess a safety device responsive to excess coning will act to reduce the pitch of the blades. This sequence of events requires some time and it may readily be appreciated that a time lag is an undesirable feature in the event that engine power fails at low altitude. It therefore becomes desirable to have a device which will reduce blade pitch rapidly.

The modification of my invention set forth in Fig. 1 incorporates a fast acting safety device which overcomes the objections to the prior devices. This new safety device is responsive not only to excessive coning to decrease blade pitch but is also responsive to the forward blade movement into the auto-rotational position to decrease the pitch of the blades. This modification of my invention may be readily adapted to the R-4 type of rotor head without making any material changes in the structure.

Referring to Fig. 1, the rotor blade 10 is mounted on a stub shaft 12 which is pivoted at its inner end on a drag hinge 14 on flapping link 16. The stub shaft 12 may be rotated about an inner shaft to increase or decrease the pitch as is shown in detail in my aforementioned Patent No. 2,517,509. The flapping link 16 is mounted on the hub 22 by means of flapping hinge 18 which is off-set from the center of drive shaft 20 and lies on the extended radius of said drive shaft. The hub 22 is driven by the drive shaft 20.

On the drive shaft extension 24 above the hub 22 is mounted a splined sleeve 26 which is driven by the shaft extension 24 through splines 27 which will permit the sleeve 26 to be moved axially on the shaft 24. The plate 28 and the universally mounted star 30 are integral with sleeve 26 and rotate therewith. One end of the walking beam 32 is pivotally connected to the plate 28 through lugs 34. The other end of the walking beam connects to the azimuthal control rod 40 by means of a ball universal 38. At a point between the ends of the walking beam 32, the control rod 50 is pivotally connected as at 51. The lower end of the control rod 50 is connected to a control horn 52 by means of a ball universal 54. The control horn 52 connects to the outer sleeve of the stub shaft 12 to pivot blade 10 for pitch changes.

The position of the sleeve 26 and consequently plate 28 is determined by the position of the total pitch stick 35 which actuates the total pitch rod 36 which is co-axial with and lies inside of the drive shaft 20 and its extension 24 and is connected at its upper end with plate 28. If the stick 35 is moved upwardly, the rod 36 and plate 28 will be moved upwardly. It will be apparent that when the plate 28 is raised, the inner end of the walking beam 32 will rise to increase the pitch of the blade 10 by means of rod 50 and control horn 52.

Cyclic pitch control of the blade is attained by movement of control rods 42 (one of which is shown in Fig. 1) which tilt the stationary star 44 about its universal connection 44a with drive shaft 20 in any desired direction. The inclination of the stationary star 44 is imparted to the rotating star 46 by means of a bearing 44b. The lower end of the control rods 40 are universally connected to the rotating star 46 through ball joints 48. It will be apparent that when the stars 44 and 46 are tilted so as to raise the control rod 40, the outer end of the walking beam 32 will be raised and will cyclically increase the blade pitch. For the details of construction of the rotating and stationary star, reference my be had to my aforementioned Patent No. 2,517,509.

As is well-known, when a helicopter rotor blade is driven through an off-set flapping hinge as shown herein, the blade will tend to align itself with the flapping link 16 as a result of centrifugal and aerodynamic forces. The instant torque is no longer applied to the drive shaft, the blade will tend to align itself with the extended radius of the drive shaft 20 passing through the center of the vertical hinge pin 14. This action is almost instantaneous in a rotor which has no dampers. Hydraulic friction dampers will tend to retard this action very slightly.

For the purpose of utilizing these actions about the drag and flapping hinges, an arm 60 has been mounted on the inner end of the stub shaft 12 on the portion thereof which is pivoted on drag hinge 14 and does not rotate when the control horn 52 is moved. It will be evident that when the blade moves from the power-on to the power-off (auto-rotative) position the arm 60 will rotate about the drag hinge 14. This movement of the arm 60 is transmitted through a push-pull rod 66 to a composite bell crank 62 which is mounted on pivot 64 on the flapping link 16.

Thus, as the blade moves forward or to the right in Fig. 1, the bell crank 62 will be rotated about pivot 64 in a clockwise direction and will pull down on the cable 68 which is connected to the bell crank 62 at 70, and is connected at its upper end to the star 30. It is to be noted that the cable is slack and the star 30 may be tilted about its universal mounting 37. Therefore, the hunting action of one blade about its drag hinge 14 will not effect the change of pitch by downward movement of the star 30. However, when all the blades move forward to the auto-rotative position, the slack in the cables will be taken up and the star 30 will be forced downwardly which will move pivot 34 of beam 32 about point 38 and reduce pitch by means of rod 50 and horn 52. When the blades cone to excess the bell crank 62 will not rotate about its own pivot but will rotate about the flapping hinge 18 to move the cable 68 down and reduce the pitch. To relieve the shock of the slack take-up in the cable 68, the cable connection to the star 30 acts through springs 72. This also allows an override in case of excessive motion and prevents failure of the cables.

This modification of my invention provides a mechanism which has no function during normal flight, but which will reduce the pitch of the blades when the coning angle becomes excessive or when the blades move to the auto-rotative position. This feature insures proper low pitch setting during critical maneuvers.

The modification shown in Fig. 2 is structurally the same as that shown in Fig. 1 with the exception that a push-pull rod 100, connected to star 30 by ball and socket joint 102, has been substituted for the slack cable 68 and the total pitch rod 36 has been eliminated. The substitution of the rod 100 for the cable 68 renders the pitch setting automatic in response to changes in the throttle setting.

As the throttle is increased, the torque is increased and the blades drag back around the drag hinge 14. When the blades drag back, the arms 60 will rotate the bell crank 62 in a counterclockwise direction to raise the star 30. When the star 30 rises the inboard end of the walking beam 32 and the pitch control rod 50 rise to move the control horn 52 in the pitch increasing direction. When the throttle setting is decreased, the blades move forwardly around the drag hinge due to the inertia effect and rotate the bell crank 62 in a clockwise direction to move the star 30 downwardly and decrease the pitch. Should the engine fail, the blades will move to the auto-rotative position and the bell crank 62 will move the star 30 down until the blade pitch is at the optimum auto-rotative setting.

Movement of the blade about the flapping hinge 18 during flapping or coning movements will not rotate the bell crank 62 about its pivot 64 but will cause the bell crank to rotate with the flapping link 16 around the flapping hinge 18 to move the star 30 downwardly and decrease the pitch. When the blades flap individually, the star 30 will merely tilt about its universal connection and will not reduce the pitch of the blades. When all the blades move upwardly to increase the coning angle the star 30 no longer may tilt and therefore the pitch of the blades will be reduced.

In normal power-on forward flight, there will be some degree of hunting of the blade about the drag hinge 14. The hunting movement will be transmitted to the star 30 through the bell crank 62 and the push-pull rod 100 but will merely tilt the star 30 since the hunting of one blade will generally be counteracted by opposite motion of the other two blades.

In the modifications shown in Figs. 1 and 2, the drag hinge is not inclined and therefore there is no "real" Delta-3 action. However, there is a virtual inclination of the drag hinge and therefore a "virtual" Delta-3 action since the point of connection between the control rod 50 and the control horn 52 does not lie on the extended axis of the flapping hinge. With such a connection, as the blade flaps or cones the point of connection 54 will not rotate about the axis of the flapping hinge and therefore the pitch of the blade 10 will be decreased.

The advantage of a "virtual" Delta-3 action is that the degree of such action may be varied simply by moving the point of connection toward or away from the axis of the flapping hinge. It should be understood that all the modifications shown herein will be operative with a "real" Delta-3 effect or with no Delta-3 effect.

A Delta-3 action is particularly desirable when the blades are flapping (i. e., moving about the flapping hinge individually as a result of aerodynamic forces). As will be most evident with reference to Fig. 2, the Delta-3 action and the automatic pitch reduction have an additive effect. This effect has the disadvantage of hindering a fast pull-out from a dive and other sharp maneuvers. For example, in a pull-out from a dive, the coning angle of the blades will, of course, increase. Since the Delta-3 action and the automatic mechanism both tend to decrease the pitch, the coning angle is reduced thus preventing a sharp pull-out. Under ordinary circumstances the pilot may allow for this effect but when maneuvering close to the ground it is highly desirable to be able to pull-out of a dive rapidly. This objection has been overcome in the modification shown in Fig. 3 which retains the Delta-3 action for blade flapping but does not decrease the pitch of the blades when the coning angle is increased. While the disclosure of Fig. 3 shows a different type of rotor head, it is to be understood that the modification shown therein will be fully operative on a rotor head of the type shown in Fig. 2 and many others.

Referring to Fig. 3, the rotor blade 110 is mounted on stub shaft 112 which is pivoted at its inner end on a drag hinge 114 on flapping link 116. The flapping link 116 is mounted on the hub 122 by means of an off-set flapping hinge 118 as in Figs. 1 and 2. The hub 122 is driven by the drive shaft 120 which is driven by engine 121 through suitable mechanism represented by the dashed line 123.

The universally mounted star 130 is co-axial with the drive shaft 120 and driven thereby through splines 138. The points of the star 130 are universally connected at 137 to the upper ends of control rods 140 which connect at their lower ends to a bell crank 162 which is mounted on an upwardly projecting lug 142 integral with flapping link 116. It is here to be noted that the bell crank 162 is mounted in a reversed position as compared to the composite bell crank 62 in Figs. 1 and 2. The bell crank 162 is connected at 148 to a push-pull link 166 which is mounted on the arm 160. Arm 60 is mounted on the inner end of stub shaft 112 on the portion of the latter which is pivoted on drag hinge 114 and does not rotate when control horn 152 is moved.

The pitch changing mechanism in this modification utilizes a stationary, or non-rotating, swash plate 144 and a rotating swash plate 146, both of which are tiltable in any direction and may be moved axially with respect to the drive shaft 120. The stationary swash plate 144 is held against rotation by means of scissors 150 which are connected to the plate 144 and to a stationary part of the helicopter frame at 154. The stationary plate 144 may be tilted in any direction by means of control rods 156 (only one of which is shown for the sake of clarity) which are actuated by rotation of the bell cranks 158 through conventional control mechanism. The rotating swash plate 146 is universally connected to the drive shaft 120 and is driven thereby through splines 170. The swash plates 144, 146 are connected by means of suitable bearings so the tilt or axial movement of one will be imparted to the other. An inclined push-pull rod 172 connects the rotating swash plate 146 to the control horn 152 on stub shaft 112.

As previously stated, the star 130 is universally mounted on a shaft 136. The lower end of shaft 136 is mounted in a two-way thrust bearing member 174. The bearing member 174 is connected to beam 178 at a point 176 between the ends thereof. As viewed in Fig. 3, the left hand end of beam 178 is connected to rod 180 at a point 182. The connection between the control stick 184 and rod 180 is an irreversible jackscrew 185, and the point 182 may therefore be considered as fixed since it is only moved when the total pitch stick 184 is moved either in an emergency or for trimming the total pitch. Therefore, axial movement of the shaft 136 will move the point 176 up or down, and consequently the right end of the beam 178 up or down. A rod 186 connects the right end of beam 178 to the right end of beam 188. The other end of the beam 188 is connected at 190 to a stationary part of the helicopter. At some point 192 between the ends of the beam 188 is a connection to the stationary swash plate 144.

It will be apparent that downward movement of the shaft 136 will move the point 176 on beam 178 and consequently the right hand end of beam 188 down. Downward movement of the right end of the beam 188 will cause downward movement of the stationary swash plate 144 and rotating swash plate 146, which will move the control horn 152 downwardly to reduce the pitch of the blade 110.

In normal operation the pitch of the blades 110 will be determined by the setting of the throttle 125 in a manner similar to that set forth with reference to Fig. 2. As the throttle 125 is increased, each blade will drag back (to the left), rotate its arm 160 about the drag hinge and rotate its bell crank 162 about its own pivot to move the star 130 upwardly. This upward movement of the star will be transmitted to the swatsh plates by means of rod 136, beam 178, rod 186, and beam 188. Therefore, upward movement of the star 130 will move the swash plates upwardly to increase the pitch of the blades. In the event the engine power should fail the blades will swing forward to the autorotative position, bell cranks 162 will be rotated in a counterclockwise direction and star 130 and shaft 136 will move downwardly. This downward movement will reduce the pitch of the blades 110 to the auto-rotative pitch setting in the manner set forth above.

During normal power-on operation in forward flight there will be some degree of hunting (lag-lead movement) of the blade 110 about the drag hinge 114. As explained with reference to Fig. 2, this hunting action will merely tilt the star 130 without causing any axial movement thereof. It should be noted, however, that due to the inclination of the control rod 172 connecting the control horn 152 and the swash plate 146 there will be aerodynamic damping of the hunting. Thus, as the blade swings forward, or leads, the control rod 172 will be moved toward a vertical position which will cause the control horn to be moved upwardly and the pitch of the blade to be increased. The increased pitch will increase the drag to return the blade to a normal position. So, also, when the blade lags, the rod 172 will be moved further from the vertical position, reduce the pitch and the drag of the blade, and then to return the blade to normal. It will be apparent that the hunting action is aerodynamically damped. These pitch variations are of small magnitude and have little or no effect on the other actions inherent in this automatic rotor head. It is to be understood that my invention does not depend upon this aerodynamic damping and is fully operative on rotor heads having no such provision.

In normal forward flight there will be a certain amount of flapping or movement of individual blades about their respective flapping hinges. Since the connection between the control horn 152 and the rod 172 does not lie on the extended axis of the flapping hinge, upward movement or flapping of the blade will cause the pitch to be reduced due to the "virtual" Delta-3 action. It is to be noted that upward movement of the blade will not cause the bell crank 162 to be rotated about its own pivot, but will cause the bell crank to be rotated with the flapping link 116 about the flapping hinge to move rod 140 upwardly. As the blade flaps, such action is independent of the other blades and therefore upward movement of the rod 140 will merely tilt the star 130. Thus it will be seen that as each blade flaps there will be a "virtual" Delta-3 action but there will be no action due to the automatic mechanism.

When the coning angle is increased, however, there will be movement of the automatic pitch mechanism since, when all the blades move upwardly about the flapping hinge, the star 130 is no longer free to tilt and must, therefore, move upwardly. In a sharp maneuver such as a pullout from a dive, the coning angle of the blades is increased. At this critical time, it is desired that there be no reduction in pitch. The "virtual" Delta-3 action will, however, reduce the pitch. On the other hand, as a result of the compensating mechanism including links 166 and bell cranks 162, the star 130 will be moved upwardly and increase the pitch. It is a simple matter to have these opposed actions equal so that there will be no reduction in pitch upon an increase in the coning angle.

It will be seen therefore, that this modification incorporates an automatic pitch setting in response to the throttle setting which provides aerodynamic damping of the hunting action about the drag hinge, individual Delta-3 action as the blade flaps, and compensation for such Delta-3 action to maintain the pitch of the blades constant when the coning angle is increased.

A total pitch control stick 184 may be provided, if desired, to permit adjustment of the reference point 182 through the irreversible jackscrew 185 and may also be used to effect a momentary increase in pitch and a resultant increase in lift. If desired, similar control may be provided for the modification shown in Fig. 2.

In all the modifications shown the rotor drive mechanism has been eliminated for the sake of clarity. It is to be understood that such mechanism may be any desired type.

It is to be understood that while I have shown and described my invention in detail in what is now considered to be the preferred forms, it is obvious that modified structures and components may be used. Accordingly, I wish not to be limited in my invention only to those forms shown and described but by the scope of the following claims.

I claim:

1. In a helicopter, a rotor drive shaft, a hub rotated by said shaft, two adjustable pitch blades, means for connecting said blades to said hub for flapping movements and for lag-lead movements in the plane of blade rotation including a blade root fitting for each blade, each of said fittings having a drag hinge and a flapping hinge by which said fittings are pivotally connected to said blades and to said hub, mechanism for changing the pitch of said blades collectively, and means including a universally mounted member movable along the axis of said shaft and connected with said blades and with said collective pitch changing mechanism for maintaining the collective pitch of said blades fixed during individual movement of said blades about their respective flapping and drag hinges and operative automatically in response to like simultaneous movement of both of said blades about either hinge axis for collectively adjusting the pitch of both of said blades.

2. In a helicopter, a rotor drive shaft, a hub rotated by said shaft, two adjustable pitch blades mounted on said hub, each blade having a drag hinge by which it is pivotally mounted on said hub, mechanism for collectively changing the pitch of both blades, means connected with each blade for adjusting the pitch of each individual blade in response to movement of that blade about the axis of its drag hinge, and means connecting each blade with said collective pitch changing mechanism and operative in response to like simultaneous movement of both blades about the axes of their respective drag hinges for operating said collective pitch changing mechanism.

3. In a helicopter, a shaft, a plurality of variable pitch blades, means for connecting said blades to said shaft for flapping and lag-lead movements in the plane of rotation thereof including pivots disposed at substantially 90° to each other, means carried by said shaft and movable axially of said shaft in response to like movement of all of said blades about either of said pivots to change the pitch of all of said blades collectively including a member having a universal connection with said shaft by which it is tiltable relative to said shaft, and means operatively connecting the several blades with said member at points spaced around the periphery of the latter and spaced from said shaft axis.

4. In a helicopter, a rotor shaft, a hub rotatable by said shaft, a plurality of blade root fittings, a rotor blade pivotally mounted on each of said fittings for pitch changing movement about the longitudinal axes of said blades, a flapping link for each blade pivotally connected with said hub by a flapping hinge for individual flapping and joint coning movements of said blades, a drag hinge pivotally connecting each blade fitting with a flapping link for lead-lag movements of the blades in the plane of blade rotation, means for cyclically changing the pitch of said blades including swashplate mechanism having an operative connection with each blade, collective pitch control mechanism, a universally mounted member reciprocable along the axis of said shaft and having an operative connection with said collective pitch changing mechanism, and mechanism carried by said flapping links and operatively connecting the blade root fittings of said blades with said universally mounted member for operating said collective pitch control mechanism in response only to like simultaneous movements of all of said blades about either of said hinges.

5. In a helicopter, a rotor shaft, a plurality of rotor blades, each having a root fitting on which it is pivotally mounted for pitch changing movements about its longitudinal axis, a blade horn on each of said blades, means for connecting said blades to said shaft for flapping movements and for lag-lead movements in the plane of blade rotation including a drag hinge and a flapping hinge, means for cyclically changing the pitch of said blades including swashplate mechanism having an operative connection with said blade horns, collective pitch control means, a member slidable along the axis of said shaft and having an operative connection to said collective pitch control means, a member universally mounted on said slidable member, and mechanism for operating said collective pitch control means in response only to like simultaneous movements of all of said blades about either of said hinges including linkage means connecting said blades with said universally mounted member at points spaced on the periphery of the latter and spaced from said shaft axis.

6. In a helicopter, a rotor shaft, a hub rotatable by said shaft, a plurality of rotor blades, each having a root fitting on which it is pivotally mounted for pitch changing movements about its longitudinal axis and a blade horn, means for connecting said blades to said hub for flapping movements and for lag-lead movements in the plane of blade rotation including a flapping link for each blade, each of said flapping links having an outboard drag hinge connecting it to a blade root fitting and an inboard flapping hinge connecting it to said hub, means for cyclically changing the pitch of said blades including swashplate mechanism having an operative connection with said blade horns, means for collectively changing the pitch of said blades, a member slidable along said shaft axis and having an operative connection with said collective pitch control means, a member universally mounted on said slidable member, and mechanism for operating said collective pitch means in response to like simultaneous movements of all of said blades about either of said hinges including a linkage for each blade carried by its connected flapping link, means for connecting each linkage at one end to the root fitting of a blade, and means for connecting said linkages at their other ends to said universally mounted member at points spaced around the periphery of the latter and spaced from said shaft axis.

7. In a helicopter, a shaft, a plurality of variable pitch blades having pitch control horns, means for connecting said blades to said shaft including substantially vertical hinges and substantially horizontal hinges, collective pitch control mechanism for changing the pitch of all of said blades simultaneously including swashplate mechanism, means for increasing the pitch of any one of said blades when that blade only is leading and for decreasing the pitch of any one of said blades when that blade only is lagging including connections between said swashplate mechanism and said control horns, and automatic means operatively connected with said blades outboard of both of said hinges and operatively connected with said collective pitch mechanism for adjusting the pitch setting of all of said blades as a function of the power applied thereto, whereby the pitch of all blades is at a maximum when maximum power is applied and is at a minimum when no power is applied.

8. In a helicopter, a shaft, a plurality of variable pitch blades having pitch control horns, means for connecting said blades to said shaft including drag hinges, collective pitch mechanism for changing the pitch of all of said blades simultaneously including swashplate mechanism, means including connections between said swashplate mechanism and said control horns for increasing the pitch of a blade when that blade is leading independently of the other blades and for decreasing the pitch of a blade when that blade is lagging independently of the other blades, automatic means including a universally mounted member movable along the axis of said shaft operatively connected at outboard portions thereof with said blades and operatively connected at its inboard portion with said collective pitch control mechanism for increasing the pitch setting of all of said blades simultaneously in proportion to increases of power applied thereto sufficient to overcome the decrease in individual blade pitch due to lagging of the blades and conversely for decreasing blade pitch in proportion to decrease in power applied.

9. In a helicopter, a rotor shaft, a hub rotatable by said shaft, a plurality of variable pitch rotor blades, means for attaching said blades to said hub including generally horizontal hinges permitting movement of said blades relative to a plane perpendicular to said rotor shaft, generally vertical hinges for permitting lead-lag movements of said blades in the plane of blade rotation, and blade pitch change means including a member outboard of said two hinges for effecting pitch change movement of said blades about the longitudinal axes of said blades, means for cyclically changing the pitch of said blades including swashplate mechanism universally mounted relative to said shaft having a rotative portion and a non-rotative portion, said rotative portion having an operative connection with said blade pitch change means, collective pitch control mechanism having an operative connection with said blade pitch change means, and a universally mounted member movable along the axis of the rotor shaft having its outboard portions operatively connected to the root ends of the several blades inboard of said pitch change member and having its inboard portion connected with said collective pitch control mechanism, whereby each blade can individually tilt said member and all of said blades moving in unison can move said member axially.

10. The combination claimed in claim 9, in which the member movable along the axis of the rotor shaft is connected to the blades by flexible means.

11. In a helicopter, a rotor drive shaft, a hub rotated by said shaft, a plurality of variable pitch blades, means for connecting each of said blades to said hub for flapping movement and for lag-lead movement including flapping and drag hinges, blade pitch change means for effecting pitch change movement of said blades about their longitudinal axes including a blade horn on each blade outboard of said hinges, means for cyclically changing the pitch of said blades including swashplate mechanism universally mounted relative to said shaft having a rotative portion and a non-rotative portion, said rotative portion having operative connections with said blade horns, collective pitch control mechanism including a member movable axially of said shaft having operative connections with said blade horns, and means including a universally mounted member movable along the axis of said shaft connected to said blades inboard of said blade horns and outboard of said hinges and operably connected to said axially movable member for varying the collective pitch of said blades in response to like movement of all of said blades simultaneously about either of said hinges, whereby each blade can individually tilt said member and all of said blades moving in unison can move said member axially.

IGOR I. SIKORSKY.

REFERENCES CITED

The following references are of record in the file of this patent:

UNITED STATES PATENTS

| Number | Name | Date |
| --- | --- | --- |
| 1,895,043 | Macaluso | Jan. 24, 1933 |
| 1,919,089 | Breguet | July 18, 1933 |
| 1,927,966 | Vaughn | Sept. 26, 1933 |
| 1,986,709 | Breguet | Jan. 1, 1935 |
| 2,397,154 | Platt | Mar. 26, 1946 |
| 2,397,489 | Jenkins | Apr. 2, 1946 |
| 2,415,148 | Sikorsky | Feb. 4, 1947 |
| 2,428,200 | Campbell | Sept. 30, 1947 |
| 2,432,677 | Platt | Dec. 16, 1947 |
| 2,439,089 | Hodson | Apr. 6, 1948 |